Dec. 18, 1962    S. P. WITCHELL    3,068,831
PRESSURE OPERATED VISUAL WARNING DEVICES
Filed March 6, 1961    3 Sheets-Sheet 1

INVENTOR
STANLEY PAUL WITCHELL
BY
ATTORNEYS

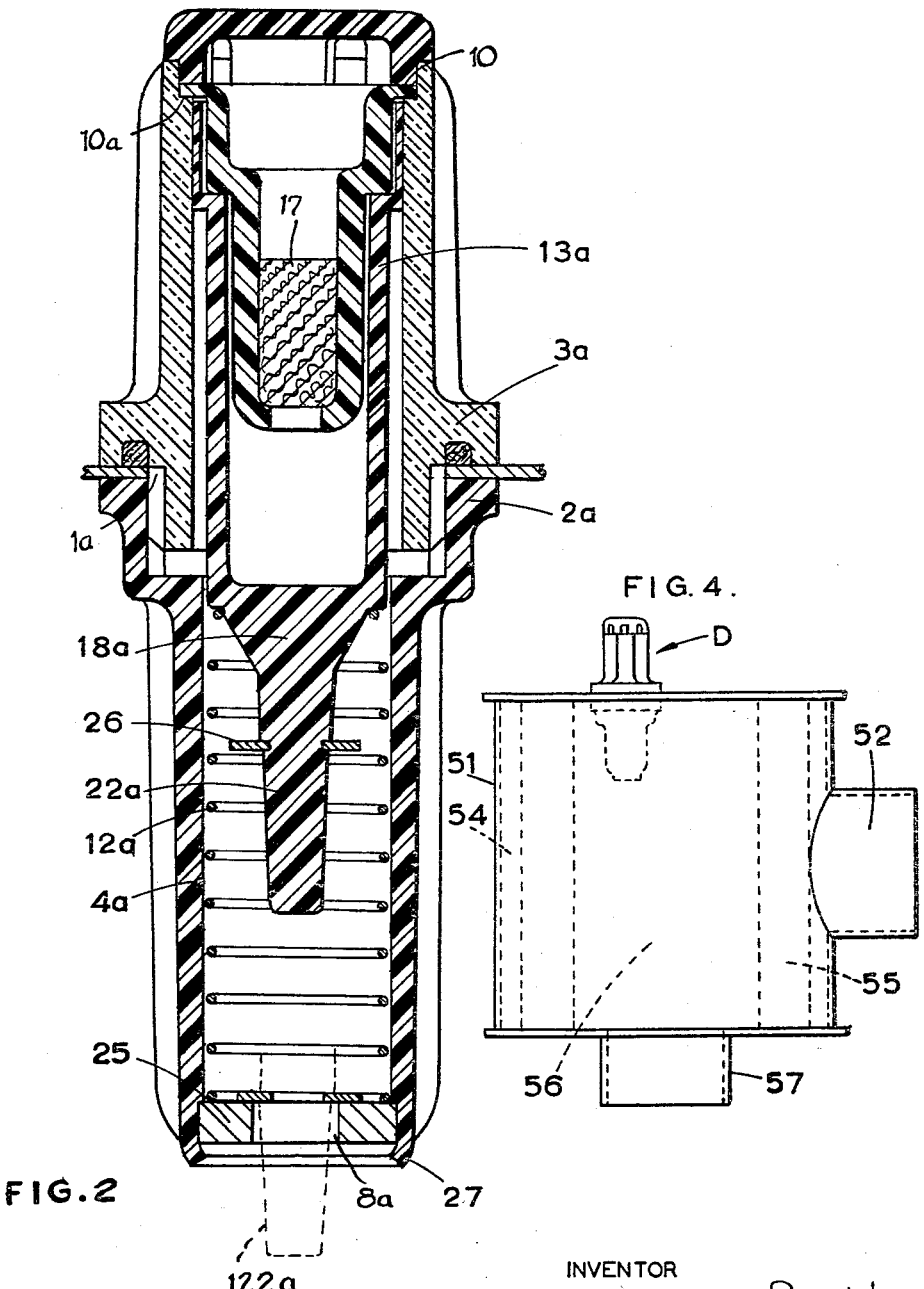

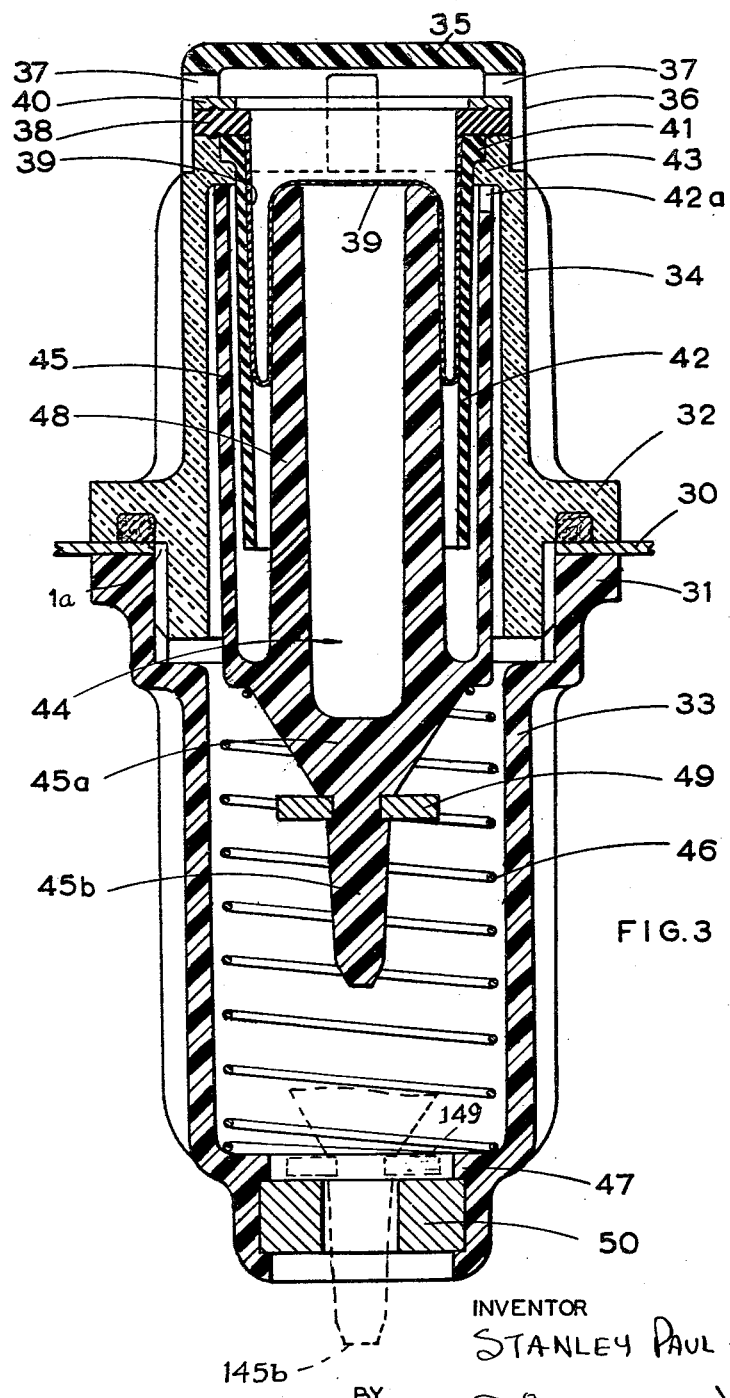

United States Patent Office 3,068,831
Patented Dec. 18, 1962

3,068,831
PRESSURE OPERATED VISUAL WARNING
DEVICES
Stanley Paul Witchell, Llanfoist, Abergavenny, England, assignor to Coopers Mechanical Joints Limited, Abergavenny, England
Filed Mar. 6, 1961, Ser. No. 93,689
Claims priority, application Great Britain Mar. 18, 1960
11 Claims. (Cl. 116—70)

This invention relates to pressure operated visual warning devices and is concerned with devices that, while being arranged to be subjected to varying pressures, become effective only at predetermined pressures, usually peak pressures. For example, in the case of certain filters, such as air intake filters for internal combustion engines, it is desirable to provide means for indicating when the filter has become seriously clogged with impurities and it is often essential that the warning should be effective after the filter has ceased working; in the example of the engine intake, this being after the engine has stopped.

One object of the present invention is, therefore, to provide a simple warning device that can be attached, for example, to the casing of a filter to be subjected to a continuously varying pressure therein, but can provide a warning available after the operation of the filter has ceased when a predetermined pressure is reached.

According to the present invention, a pressure operated visual warning device includes a casing, a movable member mounted for reciprocating movement in the casing both under the action of a variable fluid pressure acting in one direction and of resilient means acting in the other direction, means for indicating the position of the movable member with respect to the casing, and latch means for holding the movable member against the action of the resilient means when the movable member reaches a predetermined position. Very conveniently the movable member may consist of a cup arranged to reciprocate in a transparent tubular casing exposed to view, and the means for indicating the position of the movable member may include an index member fixed to and projecting into the skirt of the cup so as to be exposed to view to a greater or lesser extent as the cup reciprocates. This assembly is particularly advantageous for attachment to the top of a filter casing for an internal combustion engine, the arrangement then being such that the cup is forced downwards by the external air pressure, against spring action, as the depression on the clean side of the filter increases. When the critical depression is reached, the latch holds the cup in its lowermost position, so that even when the engine is stopped the index member, which is preferably of a contrasting colour from the cup, is exposed to view. The latch mechanism is preferably such that it can only be reset after the filter casing has been opened for the cleaning or replacement of the filter element.

Clearly it is highly desirable to provide an effective seal between the side of the cup that is exposed to the external air pressure and the depression on the clean side of the filter, both to prevent air being drawn through the warning device instead of through the filter and, in the event of the filter becoming clogged, to prevent air from being drawn through the warning device without moving the cup as far as the latched position. It is also desirable to avoid friction in the operation of the device. Therefore, the warning device may be provided with a flexible seal interposed between the cup and the casing, so as to provide an impervious barrier between the differential pressures that bring about the movement of the cup, the flexible seal being arranged to fold and extend so as to permit the full reciprocatory movement of the cup without exerting any appreciable drag thereon. The flexible seal enables the cup to be arranged so as to reciprocate within the casing structure without rubbing on the casing structure or other parts, thereby eliminating frictional drag. For example, the cup may be arranged to move under the action of a spring that locates the piston member during its movement.

The flexible seal very conveniently takes the form of a flexible, cylindrical tube, for example of rubber, closed at one end and secured around its opposite end to the casing. Then, the flexible tube projects into the cup. However, as the pressure that causes the cup to move in one direction has to be transmitted through the tube, it is necessary for the tube to be in a folded condition when the cup is at one end of its stroke. Then the flexible tube can unfold as it takes part in forcing the cup to the other end of its stroke. One way in which this can conveniently be arranged is to provide the cup with a central internal axial projection over the end of which the closed end of the flexible tube lies. Then the aforesaid index member, that projects into the skirt of the cup, is a tubular member into which the said axial projection extends with some peripheral clearance, the wall of the flexible tube extending in a folded condition into this clearance.

The flexible seal eliminates the necessity for providing any filtering material for the air entering the bell.

In order that the invention may be clearly understood and readily carried into effect, three constructions in accordance therewith will now be described in some detail, by way of example, with reference to the accompanying drawings, in which:

FIG. 2 is a vertical section through a differential pressure indicator for use on an air intake filter;

FIG. 3 is a vertical section through a third form of differential pressure indicator for use on an air intake filter; and FIGURE 4 is a diagrammatic elevation of an air intake filter for an internal combustion engine.

Figure 1:
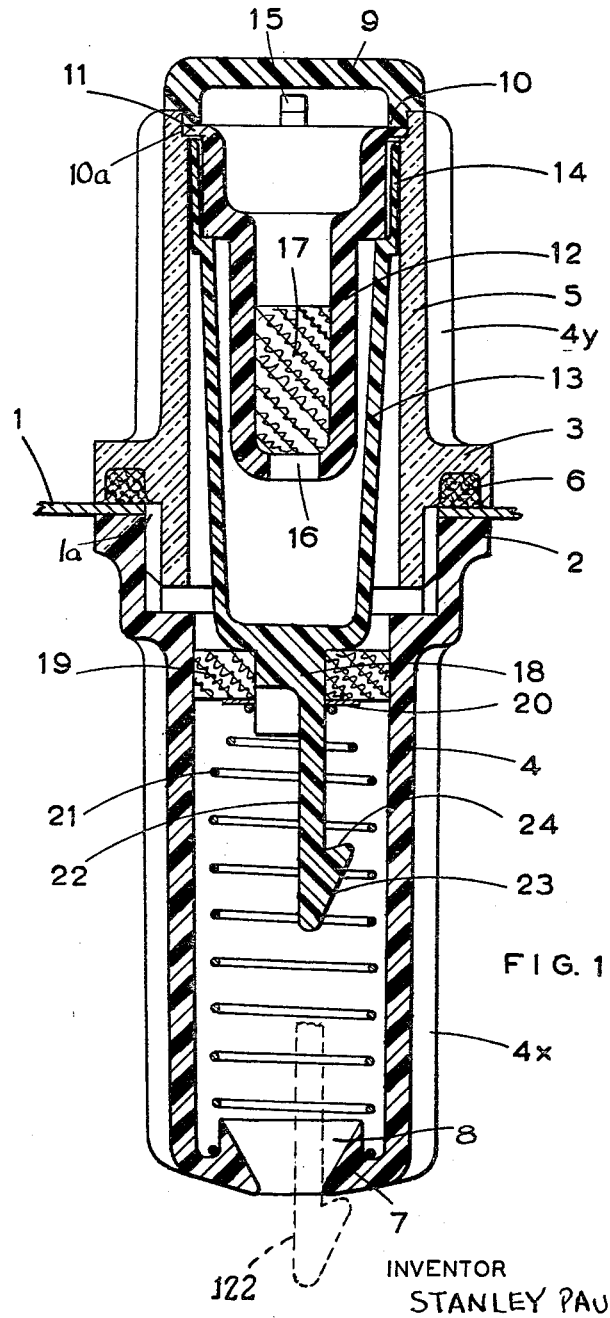
FIG. 1 is a vertical section through a differential pressure indicator for use on an air intake filter of an internal combustion engine.

Referring to FIGURE 1, the indicator is designed to be fitted to an air intake filter for an internal combustion engine the filter being such as that described below with reference to FIG. 4. For this purpose the top wall 1 of the casing of the filter is formed with an aperture 1a, the edge of which is clamped between flanges 2, 3 formed respectively on tubular members 4, 5, a sealing gasket 6 being interposed between the outer face of the wall 1 and the flange 3. The tubular members 4, 5 are formed with integral reinforcing flanges 4x, 5x.

As described in greater detail below with reference to FIG. 4, the filter casing contains an annular filter element arranged so that the impure air, after entering the casing, reaches the exterior surface of the filter element. The air passes through the wall of the filter element, leaving the impurities at the said exterior surface, and continues from the interior of the filter element to the engine. The lower tubular member 4 projects into the interior of the filter element and is formed at its lower end with a flange 7 shaped so to provide a central frusto-conical opening 8 having its narrower end lowermost. Thus, the tubular member 4 provides a chamber in communication, through the opening 8, with the interior of the filter element and so with the clean, inner face of the annular element.

The tubular member 4 is moulded from a plastic, that may be opaque, and the tubular member 5 is moulded from a transparent plastic. The tubular member 5 is closed at its top end by an opaque plastic cap 9 having a peripheral axial flange 10, between which and a shoulder 10a in the tubular member 5 is clamped a horizontal flange 11 on an index member 12, lying coaxially within the tubular member 5. An opaque cup 13 is mounted for reciprocation inside the tubular members 4, 5 and is formed at its top end with a portion 14 that is a sliding fit on the inner surface of the transparent tubular member 5. Clearance is provided between the cup 13 and the index member 12. The colours of the index member 12 and of the cup 13 are different. For example, the index member 12 may be of red plastic and the cup 13 may be of green plastic.

The interior of the cup 13 is open to the ambient atmospheric pressure through notches 15 in the cap 9 and an opening 16 at the bottom of the index member 12. The notches 15 extend above the top edge of the tubular member 5. A wad 17 of knitted or woven galvanised or copper wire is mounted in the index member 12 to filter air entering the cup 13.

The closed end of the cup 13 carries a lug 18 surrounded by a felt seal 19 which is a sliding fit inside the tubular member 4 and provides an additional seal between the interior of the cup 13 (at atmospheric pressure) and the interior of the filter element which is subjected to engine suction. A washer 20 bears on the felt seal 19 and a helical compression spring 21 is interposed between the washer 20 and the flange 7. A resilient clip 22 projects downwards from the lug 18 and can engage over the bottom of the flange 7, in circumstances described below.

In operation, the depression in the filter element is communicated through the opening 8 to the cup 13 which is, therefore, drawn, or tends to be drawn, downwards to some extent against the action of the spring 21. However, until the filter element becomes seriously fouled, the depression is not sufficient to cause the clip 22 to reach the broken line position 122. When the filter element does become seriously fouled, the clip 22 is bent laterally by cam action between an oblique surface 23 on the clip 22 and the conical surface of the opening 8, until the clip 22 descends low enough for a shoulder 24 to snap over the bottom of the flange 7. Thus, when the engine is stopped, the cup 13 does not rise under the action of the spring 21 to its uppermost position, as is normally the case, but is latched in its lowermost position, so that the index member 12 is exposed and gives a warning to a person inspecting the device that the filter element requires cleaning or replacement. When the element is removed from the casing, the end of the clip 22 is sexposed so that it can be released and permit the cup 13 to return to its normal position.

In the modification of FIGURE 2, the cup 13a is a cylindrical member having a conical lower end 18a from which projects a coaxial tapered member 22a arranged to enter a cylindrical opening 8a when the cup 13a is drawn sufficiently far down for this to happen. As the tapered member 22a projects further and further through the cylindrical opening 8a the suction increases, thereby compensating for the increasing resistance of the spring 12a due to its increasing compression.

So as to latch the cup 13a in its lowermost position, the opening 8a is formed at the centre of a disc 25 of magnetized steel and an annular keeper 26, fixed to the tapered member 22a, is held in contact with the disc 25 when the cup 13a descends low enough for this to happen. In order to release the keeper from the disc, when the casing is opened and the tapered member 22a is accessible, pressure may be applied to the end of the member 22a or another magnet may be juxtaposed to the disc 25 so as to counteract the magnetic field due to the disc 25.

It will be observed that the disc 25 is held in position against a shoulder in the tubular member 4a by an inturned lip 27 of the tubular member 4a, the compression spring 12a being interposed between the disc 25 and a shoulder on the cup 13a.

The size of the examples shown in FIGURES 1 and 2 is such that the outer diameter of the flanges 2, 3 or 2a, 3a is one inch.

Referring now to the construction of FIGURE 3, which is made substantially the same size as that of FIGURES 1 and 2, the edge of an aperture in the top wall 30 of the casing of an air intake filter for an internal combustion engine is clamped between flanges 31, 32 formed respectively on tubular members 33, 34.

The tubular member 34 is moulded from a transparent plastic and is closed at the top by an opaque plastic cap 35 having a peripheral axial flange 36 which fits into a recess round the top of the tubular member 34. The peripheral wall of the cap 35 and the flange 36 are formed with axial slots 37. A thickened flange 38 at the top of a flexible rubber tube 39 is clamped against the top of the tubular member 34 by the cap 35 with an intervening steel washer 40. The portions of the slots 37 above the washer 40 provide air inlets from the ambient atmosphere to the interior of the flexible tube 39.

A peripheral flange 41 on an index member 42 is clamped between the thickened flange 38 and an annular flange 43 formed inside the tubular member 34.

An opaque cup 44 is mounted for reciprocation inside the tubular members 33, 34 and is provided with a skirt 45 that extends with clearance between the inside surface of the tubular member 34 and the outside surface of the index member 42. In the uppermost position of the cup 44 the top edge of the skirt 45 bears against the annular flange 43, as shown in FIGURE 3, being held in this position by a helical compression spring 46 interposed between the cup and a shoulder 47 at the bottom of the tubular member 33. The top edge of the skirt 45, is, however, formed, for example, with notches 42a so as to permit an equalization of pressure between the annular space inside the skirt wall and the annular space outside the skirt.

Inside the cup 44, a central tubular axial projection 48 is provided and the closed end of the flexible tube 39 extends over this and the wall of flexible tube 39 is folded, as shown in FIGURE 3, into a clearance space between the axial projection 48 and the interior of the index member 42. Thus, one end of the flexible tube 39 constitutes a re-entrant portion inside the other end of the flexible tube 39.

The lower end of the bell is formed as a cone 45a with a projecting coaxial tapered member 45b which carries an annular keeper 49 that co-operates with a ring 50 of magnetized steel, fixed at the bottom of the tubular member 33, to latch the cup 44 in its lowermost position when drawn downwards as described below.

The interior of the tubular members 33, 34 is in communication through the ring 50 with the suction side of an annular filter element (not shown) into which the member 33 projects. When the pressure within this element falls below a predetermined value, the ambient atmospheric pressure wtihin the flexible tube 39 serves to force the cup 44 downwards against the action of the spring 46, it being understood that the area of the annular space which lies between the projection 48 and the interior of the index member 42 and which lies below the fold in the flexible tube 39, is in communication with the lower pressure by way of the aforesaid notches 42a formed in the top of the skirt 45. This, taken in conjunction with a careful choice of the aforesaid area in relation to the area of the interior of the projection 48, prevents the flexible tube from being forced inside the projection 48.

As the suction increases, the cup 44 descends against the action of the spring 45 until the keeper 49 engages the magnetized ring 50, which latches the cup 44 in its lowermost position and holds it in that position, even after the internal combustion engine has stopped, so that the fact that the filter element has become seriously fouled is indicated by the exposure of the index member 42, which is a colour that is different from that of the skirt 45.

FIGURE 4 shows an air intake filter for an internal combustion engine, a simple, orthodox filter being shown diagrammatically with the addition of a visual warning device D which may be as shown in any of FIGURES 1 to 3. The filter has a cylindrical casing 51 with a lateral air inlet duct 52. The air enters an annular space 54 round a cylindrical paper filter element 55 which has a pleated impregnated wall extending from top to bottom of the casing. After passing through the wall of the element, the air enters a space 56 into which the device D projects. The clean air is drawn out of the filter through a duct 57 connected to the suction side of the internal combustion engine.

I claim:

1. A pressure operated visual warning device comprising, in combination, a casing formed at opposite ends with openings, a movable member mounted for reciprocating movement in said casing between first and second opposite extreme positions under the action of differential gas pressures applied through said openings at opposite ends, resilient means operative to resist the movement of said member from said first extreme position to said second extreme position, said resilient means being increasingly stressed in such movement and tending always to return said movable member to said first extreme position, means for indicating the position of said movable member with respect to said casing when said movable member is in said second extreme position, and latch means comprising a first and a second element, said first element being fixed to said casing and said second element being fixed to said movable member for automatically locking said movable member, on reaching said second extreme position, against the action of said resilient means.

2. A pressure operated visual warning device as claim in claim 1, in which said two elements in said latch means are ferromagnetic and one of said ferromagnetic elements is magnetized so that said movable member is magnetically locked in said second extreme position.

3. A pressure operated visual warning device comprising, in combination, a casing formed at opposite ends with openings and having a transparent side wall, a movable member in the shape of a cup mounted for reciprocation in said casing between two extreme positions with the skirt of said cup travelling parallel to the side walls of said casing, resilient means operative to resist the movement of said cup from one extreme position to the second extreme position, said resilient means being increasingly stressed in such movement and tending always to return said movable member to said one extreme position, an index member fixed to one end of said casing and projecting into said skirt so as to be obscured by said skirt in said one extreme position and to be exposed by said skirt in the second extreme position, and latch means, comprising two elements, one fixed to said casing and one fixed to said movable member, for automatically locking said movable member in said second extreme position, on reaching said second extreme position under the action of differential gas pressure applied through said openings, against the action of said resilient means.

4. A pressure operated visual warning device as claimed in claim 3, comprising also latch means for holding said movable member against the action of said resilient means when said movable member reaches a predetermined position.

5. A pressure operated visual warning device comprising, in combination, a cylindrical casing having a transparent cylindrical wall and formed at one end with at least one air inlet opening, a coaxial, metallic annular element mounted at the opposite end of said casing, and providing an air outlet opening, a movable member in the shape of a cup mounted for reciprocation in said casing with the closed end towards one end of said casing, said cup providing a barrier between the two ends of said casing, a ferromagnetic element fixed to said cup, one of said two elements constituted by said ferromagnetic annular element and said ferromagnetic element being magnetised so that they are held together magnetically when they approach closely to one another, and an index member fixed coaxially in said casing and projecting into said cup so as to be exposed to view to a greater or lesser extent through said transparent wall as said bell reciprocates.

6. A pressure operated visual warning device as claimed in claim 3, wherein said movable member is a sliding fit in said casing.

7. A pressure operated visual warning device as claimed in claim 3, wherein said movable member is mounted to reciprocate without rubbing on said casing or other part of the device, said member being located by said resilient means during its movement, and the device further comprising a flexible seal interposed between said movable member and said casing so as to provide an impervious barrier to the gas while permitting full reciprocating movement of said movable member without exerting any appreciable drag thereon.

8. A pressure operated visual warning device as claimed in claim 5, comprising also a non-magnetic tapered member fixed coaxially to said cup and arranged to enter, with its smaller end foremost, said ferromagnetic annular member to an increasing extent as said cup approaches said ferromagnetic annular member.

9. A pressure operated visual warning device comprising, in combination, a cylindrical casing having a transparent cylindrical wall and formed at opposite ends with openings, a movable member in the form of a cup mounted to reciprocate coaxially with clearance in said casing, resilient means arranged to resist the movement of said cup in one direction and to assist the movement of said cup in the opposite direction, said resilient means being operative to guide said cup in its reciprocatory movement, an index fixed coaxially in said casing and projecting with clearance into said cup so as to be exposed to view to a greater or lesser extent through said transparent wall, a flexible seal in the form of a flexible, cylindrical tube closed at one end and secured around its opposite end to said casing at a point beyond said cup, an axial projection fixed to the inside of said cup and projecting from the closed end thereof with some peripheral clearance, the wall of said flexible tube extending in a folded condition a substantial distance into said last-mentioned clearance, with the closed end of said tube engaging the free end of said axial projection, when said cup is at one end of its stroke, and latch means for holding said cup against the action of said resilient means when said cup is at the other end of its stroke.

10. A pressure operated visual warning device comprising, in combination, a casing formed at opposite ends with openings and having a transparent side wall, a movable member in the shape of a cup mounted for reciprocation in the casing with the skirt of said cup travelling parallel to the side walls of the casing, resilient means operative to resist the movement of said member in one direction of the reciprocatory movement, an index member fixed to one end of said casing and projecting into said skirt so as to be exposed to view to a greater or lesser extent through said side wall as said cup reciprocates, said cup and said index member respectively being moulded from plastic materials of contrasting colours so that the position of said skirt with respect to said index member, depending on differential gas pressures applied through said openings at opposite ends of said casing, can readily be seen, and latch means for holding said movable member against the action of said resilient means when said movable member reaches a predetermined position.

11. An air filter for an internal combustion engine comprising, in combination, a casing formed with air inlet and outlet apertures, a filter element mounted in said casing and formed so that air entering said inlet aperture normally passes through said filter element prior to passing through said outlet aperture, and so that a space is provided between said filter element and said outlet aperture, and a pressure operated visual warning device providing a by-pass for said filter element when the latter becomes unduly dirty, said warning device including a casing secured to said filter casing and formed at opposite ends with openings, a movable member mounted for reciprocating movement in said casing under the action of differential air pressure between ambient pressure applied through one of said openings and the pressure in said space applied through another of said openings, resilient means operative to resist the movement of said member in one direction of the reciprocating movement, means visible outside said filter casing for indicating the position of said movable member with respect to said warning device casing, and latch means, located in a portion of said warning device located inside said filter casing, for holding said movable member against the action of said resilient means when said movable member reaches a predetermined position.

References Cited in the file of this patent

UNITED STATES PATENTS

| | | |
|---|---|---|
| 2,225,675 | West | Dec. 24, 1940 |
| 2,948,151 | Astl | Aug. 9, 1960 |